May 8, 1923.
H. A. THRUSH
PRESSURE RELIEF VALVE
Filed July 9, 1920
1,454,353
2 Sheets-Sheet 1
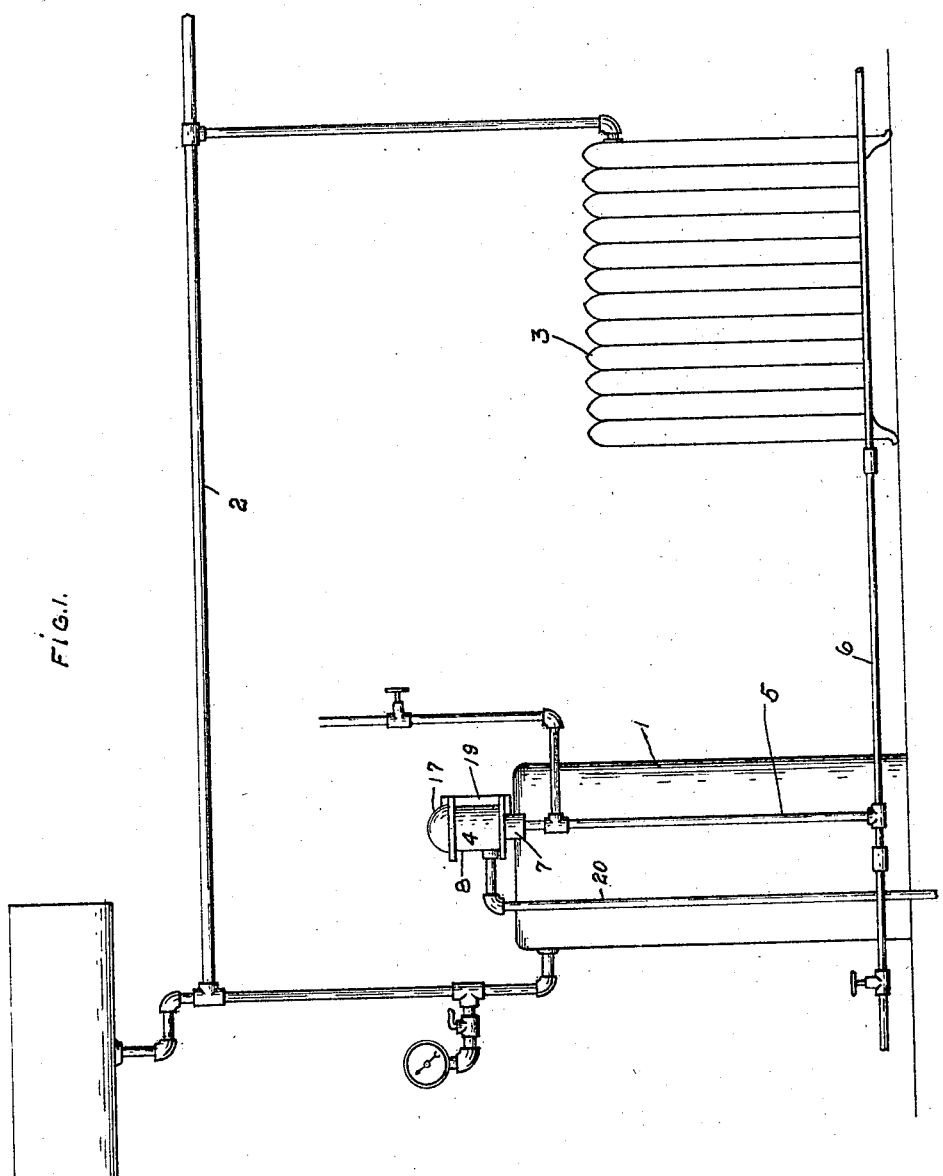
INVENTOR.
HOMER A. THRUSH
BY
ATTORNEY.

May 8, 1923.

H. A. THRUSH 1,454,353

PRESSURE RELIEF VALVE

Filed July 9, 1920

2 Sheets-Sheet 2

INVENTOR.
HOMER A. THRUSH
BY
ATTORNEY.

Patented May 8, 1923.

1,454,353

UNITED STATES PATENT OFFICE.

HOMER A. THRUSH, OF PERU, INDIANA.

PRESSURE RELIEF VALVE.

Application filed July 9, 1920. Serial No. 394,957.

*To all whom it may concern:*

Be it known that I, HOMER A. THRUSH, a citizen of the United States, residing at Peru, in the county of Miami and State of Indiana, have invented certain new and useful Improvements in Pressure Relief Valves, of which the following is a specification.

This invention relates to pressure relief valves and is primarily adapted for use in connection with boilers and radiators for heating purposes, and the prime feature of the invention is in so constructing and applying the relief valve that the return or cooled water will be discharged from the overflow in order to relieve any excess pressure in the boiler or radiators.

A further feature of the invention is the provision of a diaphragm which receives the excess pressure from the water in the boiler and radiators and automatically opens the valve, the stem of the valve having means associated therewith for regulating the pressure required for unseating the valve. Likewise, the stem is in a manner flexibly connected with the valve proper so that the valve may yield to compensate for any inequalities in the valve seat or the contacting face of the valve.

Other objects and advantages will be hereinafter more fully set forth and pointed out in the accompanying specification.

Figure 3:
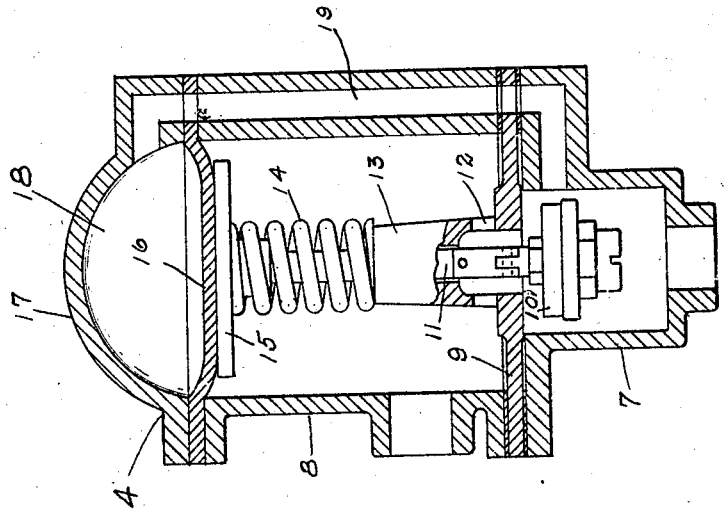
Figure 2:
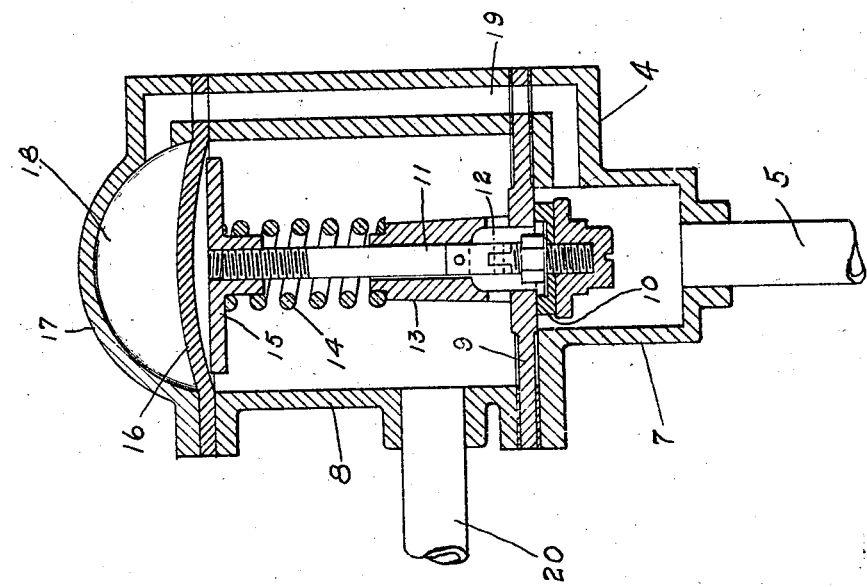

In the accompanying drawings which are made a part of this application,

Figure 1 is a detail elevation of a heating system showing the pressure relief valve attached thereto, Figure 2, is a central transverse, vertical sectional view through the relief valve showing the same on an enlarged scale with the valve in closed position, and Figure 3, is a similar view with the valve in open position.

Referring to the accompanying drawings in which similar reference characters denote corresponding parts throughout the several views, 1 indicates a boiler or heater which may be of the usual or any preferred construction, preferably used in dwellings for heating the same, and connected with said heater and preferably adjacent to the upper end thereof, is a flow main 2 through which the heated water is conveyed into one or more radiators 3, said main 2 being preferably carried in elevated position above the heater and radiator so as to obtain proper radiation of the water.

In heating systems of this class it is necessary to provide means for regulating the pressure in the flow pipes and radiators and to readily accomplish this result and at the same time preserve the heated water and cause the condensate or cooled water to leave the pipe line and radiators, the valve structure 4 is connected through an extension pipe 5 with the return main 6, consequently such water as is forced from the heating plant when an excess pressure occurs will be the return or cooled water, thereby retaining the heated water in the system at all times.

The valve structure 4 comprises a valve housing 7 which is connected to the upper end of the extension pipe 5, and above said housing is a cylindrical casing 8, the housing and casing being separated by a partition 9. Movably mounted in the housing 7 is a valve 10, the stem 11 of which passes upwardly through a port 12 in the partition 9, the upper face of the partition having a sleeve 13 thereon for guiding the valve stem 11, and to insure that the valve 10 will properly seat, the stem 11 is preferably formed in sections and these sections pivoted together and thus lend flexibility to the valve.

The valve 10 is normally held seated by a spring 14 which surrounds the upper end of the stem 11 and has one of its ends resting on the upper end of the sleeve 13 while the opposite end of the spring engages an adjusting nut 15 which threads on the upper end of the valve stem 11. By adjusting the nut 15 on the valve stem the pressure required to unseat the valve may be varied. Immediately above the nut 15 and the end of the valve stem co-operating therewith, is a diaphragm 16, the edges of which are confined between the upper end of the casing 8 and a cap 17, the cap 17 being hollow to form a cavity 18 above the diaphragm and by extending a by-pass 19 from the housing 7 to the cavity 18 through the walls of the housing, casing and cap, the pressure of the water in the heating system will be directed against the upper face of the diaphragm and when increased above a specified degree, the pressure will force the diaphragm downwardly and release the valve from its seat.

As the valve 10 leaves its seat the water from the return main 6 will pass upwardly through the pipe 5 and through port 12 into casing 8 and from thence through an overflow pipe 20, the flow of the water continuing until the pressure within the heating system is relieved. As soon as the pressure in the heating system has again become normal the diaphragm 16 will elevate to its normal position thereby releasing the valve 10 and permitting the spring 14 to again seat the valve against the partition 9 and cut off the flow of the water through the port and overflow pipe.

Should it be desired to attain a higher degree of temperature of the water before the pressure relief valve automatically operates the nut 15 is to be turned downwardly on the valve stem 11 thereby increasing the tension of the spring 14 and requiring a greater pressure in the heating system for unseating the valve.

In employing this form of device for controlling the pressure in the heating system and attaching the same to the return pipe instead of directly to the heater or main flow pipe of the system, none but the cooled water will be released from the heating system, thus maintaining the degree of heat in the system at the highest degree of efficiency.

Having thus fully described my said invention, what I claim as new and desire to secure by Letters Patent, is:

1. A relief valve for heating systems comprising a housing, a hollow casing attached to said housing, a partition between said casing and housing having a port therethrough, a valve for normally closing said port, a flexible stem attached to said valve, a diaphragm adapted to direct pressure against the upper end of said stem and unseat said valve when pressure is directed there against from the heating system, a by-pass extending from said housing to a point above said diaphragm, said by-pass being formed in the walls of said housing and casing and through said partition, and means for determining the degree of pressure required for unseating said valve.

2. A pressure relief valve for heating systems comprising a housing, a casing cooperating with said housing, a partition between said casing and housing having a port therethrough, a valve in said housing for closing said port, a stem flexibly connected to said valve, a diaphragm above said stem adapted to be operated by the pressure from the heating system for unseating said valve, a by-pass extending from said housing to a point above said diaphragm, said bypass being formed in the walls of said housing and casing and through said partition, yielding means for normally holding the valve seated, and adjustable means for determining the pressure required for opening said valve.

3. A pressure relief valve for heating systems comprising a housing, a casing connected to the upper end of said housing, a partition between said housing and casing having a central port, a hollow sleeve surrounding said port, a valve for closing said port, a flexible shaft carrying said valve and projecting upwardly through said port and sleeve, a diaphragm above said stem and adapted to direct downward pressure thereon for opening said valve, a spring for normally holding said valve closed, means threaded onto said stem for regulating the tension of said spring, and a by-pass extending from said housing to a point above said diaphragm and through the walls of said housing, casing and partition.

4. A pressure valve, comprising a housing, a casing above said housing, a partition between said housing and casing, said partition having a central port, a diaphragm at the upper end of said casing, a cap forming a cavity above said diaphragm, a valve for closing said port, a flexible stem carrying said valve, adjustable means at the upper end of said stem for engagement with said diaphragm, and a by-pass extending through the walls of said housing partition casing and cap for conveying heating medium from said housing to said cavity above said diaphragm.

5. A relief valve for heating systems, comprising a housing, a casing, a partition between said housing and casing, a cavity at the upper end of said casing, a diaphragm between said casing and cavity, a valve operable by said diaphragm, and a by-pass extending from said housing to said cavity and formed in the walls of the housing and casing and through said partition.

In witness whereof, I have hereunto set my hand and seal at Peru this 2nd day of July, A. D. nineteen hundred and twenty.

HOMER A. THRUSH. [L. S.]

Witnesses:
RUTH F. GRIGGS,
HURD J. HURST.